Patented June 25, 1946

2,402,639

UNITED STATES PATENT OFFICE 2,402,639

LACTONES OF MERCAPTO CARBOXYLIC ACIDS AND PROCESS OF PREPARING THEM

Wilbur A. Lazier, New Castle County, and Frank K. Signaigo, Wilmington, Del., assignors to E. I. du Pont de Nemours & Company, Wilmington, Del., a corporation of Delaware No Drawing. Application September 19, 1940, Serial No. 357,416

23 Claims. (Cl. 260—327)

This invention relates to mercapto carboxylic acids and derivatives thereof and a process for their preparation.

Frequently, organic compounds containing two different functional groups in one molecule have especially useful applications. For example, compounds of this type have become of great industrial importance for the preparation of polymeric materials. It is frequently desirable that of the functional groups present in a compound at least one be a reactive group, such as a carboxyl group, so that the molecule can be attached to another compound or material so that the properties of the remaining functional groups can be imparted to the material so treated. Heterofunctional organic compounds containing both a mercapto and a carboxyl group are of considerable utility but so far as we are aware no commercially practical and general method for obtaining materials of this type has hitherto been available.

This invention has as its object an economical process for obtaining mercapto carboxylic acids and derivatives thereof. Another object is the preparation of certain new and useful compounds. Other objects will be apparent from the following description of the invention.

To accomplish these objects, an organic compound having at least one carboxyl group or derivative thereof and a thiocarbonyl group or its sulfhydrate is catalytically hydrogenated. Alternatively, an organic compound containing at least one carboxyl group and a carbonyl group or derivative thereof is catalytically hydrogenated in the presence of hydrogen sulfide.

In practicing this invention the carbonyl group in a carbonyl carboxylic compound may be converted to the thiocarbonyl group and hydrogenated in a single operation. The carbonyl carboxylic compound is charged into a hydrogenation autoclave together with sulfur as a source of hydrogen sulfide and a sulfactive hydrogenation catalyst. The autoclave is then filled with hydrogen at superatmospheric pressure and agitated and heated to a temperature at which reaction proceeds at a suitable rate, usually in the neighborhood of 150° C. After the reaction is complete, as evidenced by no further hydrogen absorption, the autoclave is cooled and the product is filtered from the catalyst and blown with inert gas to drive out the unreacted hydrogen sulfide. The product may then be isolated or purified by the usual methods of distillation, crystallization or solvent extraction. The following examples show in greater detail the practice of this invention in several of its modifications. The amounts of materials referred to are parts by weight.

Example I

A sulfactive hydrogenation catalyst is prepared as follows: A solution of 240 parts of sodium sulfide nonahydrate and 64 parts of sulfur in 1500 parts of water is added with stirring to a solution of 238 parts of cobalt chloride hexahydrate in 1700 parts of water. The black precipitate is filtered with suction and washed substantially free from soluble salts with water. Since the catalyst oxidizes spontaneously with resulting loss in catalytic activity when exposed to air, it is stored and used as an aqueous paste or, alternatively, the precipitate, after washing with water, is washed with an organic solvent such as dioxane to remove most of the water and stored and used as a non-aqueous paste. This catalyst is used to hydrogenate a ketocarboxylic acid to a mercaptocarboxylic acid as follows.

One hundred parts of commercial laevulinic acid, 60 parts of sulfur, and 15 parts of cobalt polysulfide catalyst (dry basis) prepared as described above are charged into a hydrogenation autoclave fitted so that the contents may be agitated. Hydrogen is then charged into the autoclave to a pressure of 1000 lbs./sq. in. and the autoclave is heated to a temperature of 150° C. After the initial rapid reaction has subsided, as evidenced by the decrease in the rate of hydrogen absorption, the temperature is raised to 175° C. for four hours to complete the reaction. After cooling the autoclave, the contents are filtered to remove the catalyst and blown with nitrogen to remove the unreacted hydrogen sulfide. Titration of an aliquot of the reaction mixture with standard iodine solution indicates the presence of thiol equivalent to 37 parts of 4-mercaptovaleric acid. The reaction mixture is then fractionally distilled. There is obtained 67 parts of a fraction boiling at 94° to 95° C./22 mm. and 18 parts of a fraction boiling at 140° C./22 mm. The lower boiling fraction contains 25.5% of total sulfur and 2.5% of thiol sulfur, has a density of $d_4^{25}=1.0818$ and refractive index of $n_D^{25}=1.4936$. This material consists principally of the lactone of 4-mercaptovaleric acid formed by cyclization of the 4-mercaptovaleric acid. The higher boiling fraction contains 22.3% of total sulfur and 14% of thiol sulfur. This material contains 59% of 4-mercaptovaleric acid and the thiolactone into which it readily cyclizes. The amount of thiol obtained in the distilled fraction is less than that present before distillation, showing that some of the thiol is converted to the lactone during distillation. The reactions by which these compounds are formed may be formulated as follows:

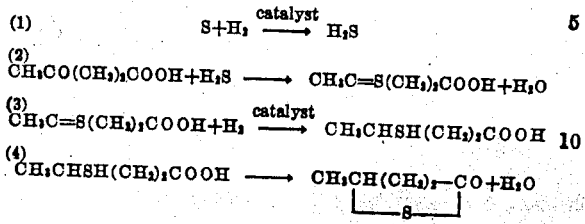

(1) $S + H_2 \xrightarrow{catalyst} H_2S$ (2) $CH_3CO(CH_2)_2COOH + H_2S \longrightarrow CH_3C=S(CH_2)_2COOH + H_2O$ (3) $CH_3C=S(CH_2)_2COOH + H_2 \xrightarrow{catalyst} CH_3CHSH(CH_2)_2COOH$ (4) $CH_3CHSH(CH_2)_2COOH \longrightarrow CH_3CH(CH_2)_2-CO + H_2O$
    $\qquad\qquad\qquad\qquad |\underline{\qquad S \qquad}|$

Example II

One hundred parts of commercial ethyl acetoacetate and 35 parts of sulfur are charged into a hydrogenation autoclave together with 6 parts of cobalt polysulfide catalyst (dry basis) prepared as described in Example I, and 55 parts of ethanol solvent. The autoclave is heated to 150° C. under an initial hydrogen pressure of 1000 lbs./sq. in. Rapid reaction ensues as evidenced by the decrease in pressure and additional hydrogen is added from time to time to maintain the total pressure within the range from 1000 to 2000 lbs. per sq. in. After 3.5 hours heating no further hydrogen is absorbed and the autoclave is cooled, the products rinsed out with ethanol, and filtered from the catalyst. Excess hydrogen sulfide is removed by blowing the solution with nitrogen, and the reaction mixture is distilled, the following fractions being obtained: A foreshot of propanethiol-2 and ethanol solvent is followed by a fraction boiling from 95 to 100° C./50 mm. This fraction, obtained in the amount of 30 parts, analyzes for 87% purity as ethyl 3-mercaptobutyrate. Water is formed in the course of the reaction, which hydrolyzes a part of the ethyl acetoacetate to acetone. The latter compound is converted to propanethiol-2. This side reaction may be avoided largely by operating in the following manner.

Ethyl acetoacetate is converted into the corresponding ethyl thioacetoacetate by passing streams of anhydrous hydrogen chloride and hydrogen sulfide through a solution of the ester in absolute alcohol at 0° C. until no further hydrogen sulfide reacts (c. f. Mitra, Chem. Abst. 32, 4945 (1938). The crude product is then diluted with water and the oil layer separated and washed with water and finally dried over anhydrous sodium sulfate. The red-colored crude ethyl thioacetoacetate is then hydrogenated in ethanol solution using cobalt polysulfide catalyst exactly as described in the preceding paragraph except that the sulfur is omitted. On working up the product there is obtained substantially pure ethyl 3-mercaptobutyrate in high yield.

Example III

A nickel sulfide hydrogenation catalyst is prepared as described in Example I for the cobalt sulfide catalyst except that an equivalent amount of nickel chloride hexahydrate is substituted for the cobalt chloride hexahydrate. Forty-seven parts of 2-carbethoxycyclopentanone and 20 parts of sulfur are charged into a hydrogenation autoclave with 5 parts of nickel polysulfide catalyst and 50 parts of dioxane solvent. The autoclave is filled with hydrogen to a pressure of 810 lbs./sq. in. and agitated and heated to a temperature of 180° C. for 5 hours. At the end of this time no further absorption of hydrogen is apparent and the autoclave is cooled and the contents filtered to separate the catalyst and warmed under reduced pressure to remove the excess hydrogen sulfide and dioxane solvent. The residue is a colorless, oily liquid consisting of a mixture of 2-carbethoxycyclopentanethiol and cyclopentanethiol. The formation of the by-product cyclopentanethiol may be avoided by hydrogenating the preformed thioketo ester following the procedure described in the second paragraph of Example II.

Example IV

Forty parts of 5-carbomethoxyvaleric aldehyde, 20 parts of sulfur, and 5 parts of cobalt polysulfide catalyst prepared as described in Example I are charged into an autoclave with 60 parts of methanol solvent. The autoclave is filled with hydrogen to an initial pressure of 800 lbs./sq. in. and heated during 45 minutes to 160° C. The reaction commences at about 100° C. as evidenced by the decrease in pressure and is very rapid at 160° C. After 2.5 hours heating no further pressure drop is observed and the autoclave is cooled and the contents filtered to separate the catalyst and blown with nitrogen to remove the hydrogen sulfide. Titration of an aliquot of the product indicates the conversion to 5-carbomethoxypentanethiol-1 to be 48% of the theoretical. Removal of the methanol solvent by warming the reaction mixture under reduced pressure yields the colorless oily 5-carbomethoxypentanethiol-1 which gives a yellow precipitate with lead acetate solution.

Example V

Another type of sulfactive catalyst is prepared as follows: Finely divided pyrophoric cobalt (prepared by the sodium naphthalene reduction of anhydrous cobalt chloride) is suspended in methanol and treated at room temperature with a stream of hydrogen sulfide until the evolution of hydrogen has ceased. The catalyst is then washed by decantation with methanol until the excess hydrogen sulfide has been removed. The catalyst is stored and used as a methanol paste. Forty-two parts of 6-ketohendecane-1, 11-dioic acid, 32 parts of sulfur, 100 parts of dioxane, and 10 parts of cobalt sulfide catalyst prepared as described above are charged into a hydrogenation autoclave together with hydrogen at an initial pressure of 1000 lbs./sq. in. The autoclave is agitated and heated at a temperature of 160° C. for three hours. During this time the reaction is very rapid, as evidenced by the decrease in pressure. Additional hydrogen is added to maintain the total pressure above 1000 lbs./sq. in. The autoclave is then heated for an additional two hours at 175° C. to insure completion of the reaction. The contents of the autoclave are filtered to separate the catalyst and blown with nitrogen to remove the excess hydrogen sulfide. Iodine titration of an aliquot of the reaction mixture indicates the conversion to 6-mercaptohendecane-1, 11-dioic acid to be 82% of the theoretical. The crude reaction mixture is warmed under reduced pressure to remove the solvent and water present, leaving the mercapto acid as a viscous liquid residue.

Example VI

One hundred twenty-five parts of 4-keto-pimelic acid, 45 parts of sulfur, and 15 parts of cobalt polysulfide catalyst prepared as described in Example I are charged into an autoclave, together with hydrogen at an initial pressure of 1000 lbs./sq. in. The autoclave is agitated and heated at a temperature of 150° to 175° C. for five hours. During this time the total decrease in pressure amounts to 2400 lbs./sq. in. and more hydrogen is added as needed to keep the pressure within the range from 1000 to 2000 lbs./sq. in. After filtering the contents of the autoclave to separate the catalyst, the crude reaction mixture is blown with nitrogen to remove the excess hydrogen sulfide. Iodine titration of an aliquot of the reaction mixture indicates the presence of a small amount of 4-mercaptopimelic acid. Distillation of the crude reaction mixture yields an oily fraction boiling at 190° to 200° C./4 mm. The distillate is dissolved in a mixture of benzene and ligroin and on cooling there is obtained, in the form of white crystals, the pure lactone of 4-mercaptopimelic acid. The compound melts at 59° to 61° C. Analysis of this material is as follows: Found: S=18.50%; mol. wt. (by saponification number) =173.9. Calculated: S=18.41%; mol. wt.=174.1. The product of the hydrogenation reaction, 4-mercaptopimelic acid, is unstable and readily cyclicizes to the lactone, as was the case with 4-mercaptovaleric acid described in an earlier example. These transformations may be formulated as follows:

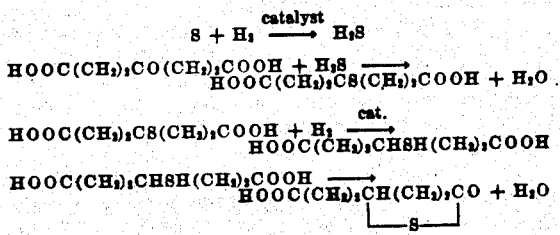

Example VII

Forty-four parts of the disodium salt of 4-keto-pimelic acid, 30 parts of sulfur, and 6 parts of cobalt polysulfide catalyst prepared as described in Example I are charged into a hydrogenation autoclave together with 100 parts of water. The autoclave is filled with hydrogen to an initial pressure of 1400 lbs. per sq. in. and agitated and heated at 150° C. Hydrogen absorption occurs very rapidly during the first hour, as evidenced by the rapid decrease in pressure, and additional hydrogen is added from time to time to maintain the total pressure within the range of 1400 to 2000 lbs./sq. in. The autoclave is heated for a total time of 4 hours to insure completion of the reaction. The contents of the autoclave are then filtered to remove the catalyst and blown with nitrogen to remove the excess hydrogen sulfide. Iodine titration of a sample of the acidified aqueous solution indicates the presence of the disodium salt of 4-mercaptopimelic acid in an amount corresponding to 80% conversion of the keto acid salt. On acidification, the free 4-mercaptopimelic acid separates out of the solution as an oil. This material is unstable and cyclicizes on distillation to the lactone of 4-mercaptopimelic acid described in the preceding example.

Example VIII

One hundred fifteen parts of diethyl 4-ketopimelate, 32 parts of sulfur, and 10 parts of cobalt sulfide catalyst are charged into a hydrogenation autoclave. The autoclave is filled with hydrogen to an initial pressure of 700 lbs./sq. in. and agitated and heated at a temperature of 150° C. for four hours. The course of the reaction is followed by the decrease in pressure indicating absorption of hydrogen and it is necessary to add hydrogen from time to time to maintain the total pressure above 700 lbs./sq. in. After three hours no further absorption of hydrogen is noted and after four hours the autoclave is cooled and the contents filtered from the catalyst and blown with nitrogen to remove the hydrogen sulfide. Titration of an aliquot of the solution indicates the presence of diethyl 4-mercaptopimelate in an amount corresponding to 22% conversion of the keto ester. On distillation there is obtained as the principal fraction an oily liquid boiling at 142° to 145° C./2 mm. It is the ethyl ester of the lactone of 4-mercaptopimelic acid which is formed from the mercapto ester by cyclization with the elimination of ethanol. These transformations may be formulated as follows:

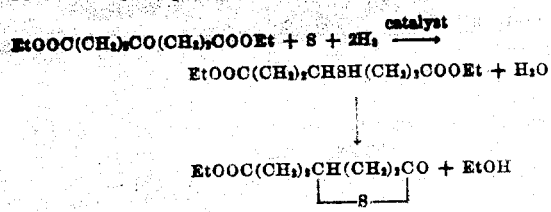

The above experiment is repeated under similar conditions except that an iron sulfide catalyst is substituted for the cobalt sulfide catalyst and the hydrogenation is carried out at 175° C. The catalyst is prepared as follows: A finely ground alloy consisting of equal weights of iron and aluminum is treated with boiling aqueous sodium hydroxide solution to remove the aluminum. The resulting finely divided iron powder is washed free from salts and alkali by decantation and then washed free from water with ethanol and stored and used as an ethanol paste. This finely divided pyrophoric iron is charged into the hydrogenation autoclave together with the other reactants. During the period of heating the autoclave up to reaction temperature the pyrophoric iron reacts with the sulfur, forming an active iron sulfide hydrogenation catalyst. After completion of the reaction the product is worked up as described above, and the ethyl ester of the lactone of 4-mercaptopimelic acid is obtained in high yield.

The conversion of various aldehydo- and keto-carboxylic compounds to the corresponding mercapto-carboxylic compounds has been illustrated in the foregoing examples. This invention is, however, not limited to these particular compounds and is likewise applicable generally to other compounds having an aldehydo or keto group and a carboxyl group. As additional examples of compounds that may be processed according to this invention, there may be mentioned the free acids, or the alkyl or aryl esters, amides, alkyl or aryl substituted amides, and the anhydrides of the following carbonyl carboxylic compounds: aldehydo acids such as glyoxylic acid; 5-carboxyvaleric aldehyde, simple keto acids such as pyruvic acid, acetoacetic acid (ethyl acetoacetate, acetoacetamide, acetoacetyl-o-toluide, diacetoacetyl ethylene diamide), 2-alkyl- or -arylacetoacetic acids, laevulinic acid, acetopyruvic acid, ketostearic acids (4-ketostearic acid, 10-ketostearic acid, 12-ketostearic acid, 12-ketostearamide, ketostearin), benzoylacetic acid, beta-benzoylpropionic acid, o-benzoylbenzoic acid; compounds having more than one carboxylic group, as for example, mesoxalic acid, acetone dicarboxylic acid, acetosuccinic acid, and ketohendecanedioic acid. In addition to the foregoing classes of compounds, the carbonylcarboxylic compounds may contain other functional groups in addition to the carbonyl and carboxyl groups. Examples of such functional groups are the ethylenic bond, the acetylenic bond, hydroxyl, amino, ether, halogen and nitro groups. Examples of compounds of this class are hydroxy keto acids such as 2-ketogluconic acid, unsaturated keto acids such as beta-benzoylacrylic acid, licanic acid, and a compound containing an ether linkage, ethyl furoylacetate.

Certain carbonyl compounds readily form hydrates which are considered to have the grouping

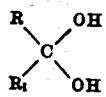

Such hydrates will behave as true carbonyl groups in the process of this invention and their conversion to thiols is likewise a part of this invention. Generally, derivatives that are hydrolyzable to carbonyl compounds may also be converted to the corresponding thiols by this process. Examples of compounds of this class are the hemiacetals, aldimines, ketimines, hydrazones, semicarbazones and anils of carbonyl carboxylic compounds.

The normal product obtained by the hydrogenation of a carbonyl carboxylic acid or derivative in the presence of hydrogen sulfide according to the process of this invention is the corresponding mercaptocarboxylic compound in which the mercapto group is attached to the carbon atom originally forming the carbonyl group. As explained in some of the foregoing examples, however, when the carbonyl group is in the four or five position with respect to the carboxyl group, the resulting mercapto carboxylic compound may undergo cyclization with the formation of a lactone.

Although not essential in most cases, solvents may be employed in carrying out the hydrogenation process. Examples of solvents that may be used are water and organic solvents such as hydrocarbons, alcohols, ethers, and the like. If the free mercapto acid is desired, then it is preferable to use as the solvent water, hydrocarbons, or ethers. On the other hand, if the mercapto carboxylic ester is desired, then it is preferable to use as a solvent the alcohol corresponding to the ester desired. When the process is applied to beta aldehydo- or ketocarboxylic compounds, it is preferable to use anhydrous solvents to minimize hydrolytic cleavage of the starting material. In addition to simple solvents, the reaction may also be accomplished in the presence of such materials as alkalies, acids, ammonia, and amines. The use of acids in the reaction media frequently leads to more rapid conversion to thiols. The use of aqueous alkali as the solvent is desirable for the conversion of delta- and gamma-carbonyl carboxylic compounds to the corresponding thiols as this prevents the formation of thiolactones. By carrying out the reaction in the presence of ammonia or primary or secondary amines, mercapto carboxylic amides may be obtained.

In the foregoing examples, the use of sulfur as a source of hydrogen sulfide has been illustrated, as this is an especially convenient way to generate the desired reagent. However, hydrogen sulfide itself may be charged into the autoclave together with the other reactants. Instead of hydrogen sulfide or sulfur, other sulfur compounds that are converted to hydrogen sulfide under the reaction conditions can be used. Examples of such materials are sulfur dioxide, ethyl tetrasulfide, carbon bisulfide and alkali or ammonium sulfides. The proportion of hydrogen sulfide to carbonyl compound employed may be varied considerably. However, it is usually preferred to employ an excess of hydrogen sulfide or source of hydrogen sulfide over the amount theoretically required.

The process of this invention may be operated over a considerable range of temperatures and pressures. Reaction occurs in many cases at temperatures as low as 100° C., but usually at a low rate. As the temperature is raised, the rate of reaction increases, and it is therefore preferable to operate at temperatures above 100° C. The upper temperature limit at which the process may be operated is determined by the thermal stability of the compound processed. In most cases, the compounds are stable at temperatures up to at least 200° C. and therefore it is suitable to operate at temperatures between 100° and 200° C. The reaction proceeds well, even at low pressures of hydrogen, but in order to insure a practicable rate of reaction it is desirable to operate at a hydrogen pressure of at least 100 lbs./sq. in. The upper limit depends upon the mechanical limitations of the equipment used for carrying out the reaction.

As examples of sulfactive catalysts that may be used in carrying out the process of this invention, it has been found that certain metal sulfides are especially suitable for this purpose since these are not poisoned by sulfur and are at the same time highly active. Examples of these are sulfides of the hydrogenating metals such as chromium, cobalt, copper, iron, lead, molybdenum, nickel, palladium, tin, tungsten, and vanadium. It is preferred, however, to use sulfides of cobalt, molybdenum, nickel, and iron, since these have been found to be exceptionally active. Such catalysts may be prepared by a variety of methods, as, for example, by precipitating the metal sulfide from a solution of a metal salt with hydrogen sulfide, a solution of alkali or alkaline earth metal sulfide or polysulfide, or with ammonium sulfide or polysulfide. Another method that has been found to yield very active hydrogenation catalysts is to treat the finely divided pyrophoric or activated metal suspended in a liquid medium with hydrogen sulfide or sulfur until sulfidation is substantially complete. Other methods for obtaining metal sulfide catalysts include heating powdered metals or metal compounds such as the oxides, carbonates, or sulfides with volatile sulfiding agents such as sulfur, hydrogen sulfide, or carbon bisulfide.

The hydrogenating activity of the metal sulfides may be increased frequently by treatment with hydrogen at elevated temperatures. The hydrogen treatment of the metal sulfide in many cases can be combined conveniently into a single operation with the hydrogenation reaction for which the catalyst is to be used.

Instead of charging the metal sulfide as such, it may be formed in situ by placing the finely divided pyrophoric or activated metal in the autoclave together with the other reactants. The sulfur or hydrogen sulfide present will convert the metal to the active metal sulfide in the early stages of the reaction process. The catalyst employed may be substantially a pure metal sulfide or a combination of metal sulfides. Other substances may be present also, as for example, kieselguhr, alumina, magnesia, carbon, and other supporting or promoter materials.

By the term "sulfactive hydrogenation catalyst" as used herein and in the claims, we mean a catalyst prepared as described in U. S. Patents No. 2,221,804 and 2,230,390, and which is active for the catalytic hydrogenation of the sulfur in organic multisulfides, organic sulfur compounds having carbon-to-sulfur unsaturation, and organic sulfur compounds having sulfur-to-oxygen unsaturation.

The proportion of sulfactive hydrogenation catalyst employed in the process of this invention may be varied considerably. Depending upon the particular catalyst used and the other conditions of operation an amount of catalyst of from 0.5 to 25%, and usually from 2 to 10% of the weight of carboxy carbonyl compound processed may be required to effect reaction at a convenient rate.

As described in most of the foregoing examples, it is especially convenient to form the thiocarbonyl compound and hydrogenate it to the corresponding thiol in a single operation. However, it is considered to be within the scope of this invention to react a carbonyl carboxylic compound with hydrogen sulfide by any suitable means and subsequently to hydrogenate the reaction product with a sulfactive hydrogenation catalyst to obtain the mercapto carboxylic compound. A standard method for forming thiocarbonyl compounds is to dissolve the carbonyl compound in absolute alcohol and simultaneously to pass streams of anhydrous hydrogen chloride and hydrogen sulfide through the cooled solution until no more hydrogen sulfide is absorbed. Thereafter the alcohol, hydrogen chloride, and excess hydrogen sulfide may be removed and the crude reaction product hydrogenated to the thiol. Other means of forming thiocarbonyl compounds may be used, as for example, by reaction of the carbonyl compound with phosphorus pentasulfide. The thiocarbonyl compounds in many cases react with hydrogen sulfide to form sulfhydrates—compounds having the grouping

In hydrogenating the preformed thiocarbonyl compound or other reaction product of carbonyl compound with hydrogen sulfide to the corresponding thiol, the conditions employed are the same as those described for the combined formation and hydrogenation of the thiocarbonyl compound except that the presence of hydrogen sulfide is not essential.

Thioaldehydo- and thioketocarboxyl compounds that may be hydrogenated according to this invention are those corresponding to each of the carbonyl compounds mentioned above, and their sulfhydrates and polymers.

This invention constitutes a useful and economical process for preparing mercapto carboxylic compounds. These products are useful as intermediates for the preparation of polymers, dyestuffs, rubber chemicals and insecticides. For example, the mercapto carboxylic acids may be oxidized to dibasic sulfonic carboxylic acids which are useful chemical intermediates.

It is apparent that many widely different embodiments of this invention may be made without departing from the spirit and scope thereof and therefore it is not intended to be limited except as indicated in the appended claims.

We claim:
1. The process for the preparation of mercapto-carboxylic compounds which comprises reacting in the presence of a sulfactive hydrogenation catalyst a carbonyl carboxylic acid substance selected from the class consisting of the acid, its anhydride, its esters and its amides with hydrogen and a substance selected from the group consisting of hydrogen sulfide and substances which with hydrogen yield hydrogen sulfide at temperatures above 100° C.

2. The process for the preparation of mercapto carboxylic compounds which comprises catalytically hydrogenating a carbonyl carboxylic compound while admixed with a substance selected from the group consisting of hydrogen sulfide, and substances which with hydrogen yield hydrogen sulfide at temperatures above 100° C.

3. The process for the preparation of mercapto carboxylic compounds which comprises reacting a thiocarbonyl carboxylic acid substance with hydrogen in the presence of a sulfactive hydrogenation catalyst.

4. The process for the preparation of mercapto carboxylic compounds which comprises reacting in the presence of a sulfide of a metal of the iron group of the periodic table a carbonyl carboxylic acid substance selected from the class consisting of the acid, its anhydride, its esters and its amides with hydrogen and a substance selected from the group consisting of hydrogen sulfide and substances which with hydrogen yield hydrogen sulfide at temperatures above 100° C.

5. The process for the preparation of mercapto carboxylic compounds which comprises reacting in the presence of molybdenum sulfide a carbonyl carboxylic acid substance selected from the class consisting of the acid, its anhydride, its esters and its amides with hydrogen and a substance selected from the group consisting of hydrogen sulfide and substances which with hydrogen yield hydrogen sulfide at temperatures above 100° C.

6. The process for the preparation of mercapto carboxylic compounds which comprises reacting a carbonyl carboxylic acid substance selected from the class consisting of the acid, its anhydride, its esters and its amides with hydrogen and a substance selected from the group consisting of hydrogen sulfide and substances which with hydrogen yield hydrogen sulfide at temperatures above 100° C., in the presence of a metal polysulfide obtained as a precipitate by reacting a soluble iron group metal salt with a substance selected from the group consisting of alkali sulfides and polysulfides, alkaline earth sulfides, and ammonium sulfide and polysulfide.

7. The process for the preparation of mercapto carboxylic compounds which comprises reacting a carbonyl carboxylic acid substance selected from the class consisting of the acid, its anhydride, its esters and its amides with hydrogen and a substance selected from the group consisting of hydrogen sulfide and substances which with hydrogen yield hydrogen sulfide at temperatures above 100° C., in the presence of a metal sulfide obtained by treating a finely divided active metal with a sulfiding agent selected from the group comprising sulfur, hydrogen sulfide, and carbon bisulfide.

8. The process for the preparation of mercapto carboxylic compounds which comprises reacting a carbonyl carboxylic acid substance selected from the class consisting of the acid, its anhydride, its esters and its amides with hydrogen and a substance selected from the group consist- ing of hydrogen sulfide and substances which with hydrogen yield hydrogen sulfide at temperatures above 100° C.

9. The process for the preparation of mercapto carboxylic compounds which comprises reacting in the presence of a sulfactive hydrogenation catalyst an aldehydo carboxylic acid substance selected from the class consisting of the acid, its anhydride, its esters, and its amides, with hydrogen and a substance selected from the group consisting of hydrogen sulfide and substances which with hydrogen yield hydrogen sulfide at temperatures above 100° C.

10. The process in accordance with claim 9 characterized in that the aldehydo carboxylic acid substance is an omega-aldehydo carboxylic acid substance.

11. The process in accordance with claim 9 characterized in that the aldehydo carboxylic acid substance is an omega-carbomethoxyvaleric aldehyde.

12. The process for the preparation of mercapto carboxylic compounds which comprises reacting in the presence of a sulfactive hydrogenation catalyst a ketocarboxylic acid substance selected from the class consisting of the acid, its anhydride, its esters, and its amides, with hydrogen and a substance selected from the group consisting of hydrogen sulfide and substances which with hydrogen yield hydrogen sulfide at temperatures above 100° C.

13. The process in accordance with claim 12 characterized in that the ketocarboxylic acid substance is a ketomonocarboxylic acid.

14. The process in accordance with claim 12 characterized in that the ketocarboxylic acid substance is 12-ketostearic acid.

15. The process in accordance with claim 12 characterized in that the ketocarboxylic acid substance is a ketodicarboxylic acid substance.

16. The process in accordance with claim 12 characterized in that the ketocarboxylic acid substance is 4-ketopimelic acid.

17. The process for the preparation of mercapto carboxylic compounds which comprises reacting in the presence of a sulfactive hydrogenation catalyst a thiocarbonyl carboxylic acid substance selected from the class consisting of the acid, its anhydride, its esters, and its amides, with hydrogen and a substance selected from the group consisting of hydrogen sulfide and substances which with hydrogen yield hydrogen sulfide at temperatures above 100° C.

18. The process in accordance with claim 17 characterized in that the thiocarbonyl carboxylic acid substance is a thioaldehydocarboxylic acid.

19. The process in accordance with claim 17 characterized in that the thiocarbonyl carboxylic acid substance is a thioketocarboxylic acid.

20. The process for the preparation of mercapto carboxylic compounds which comprises reacting, in the presence of molybdenum sulfide, a carbonyl carboxylic acid substance selected from the class of the acid, its anhydride, its esters, and its amides, with hydrogen and a substance selected from the group consisting of hydrogen sulfide, and substances which with hydrogen yield hydrogen sulfide at temperatures above 100° C.

21. As a new chemical compound the lactone of 4-mercaptopimelic acid.

22. As a new chemical compound an aliphatic mercapto-dicarboxylic compound in which the mercapto group is separated from at least one of the carboxylic groups by at least three carbon atoms in contiguous relation.

23. As a new chemical compound the lactone of a mercapto-dicarboxylic compound.

WILBUR A. LAZIER.
FRANK K. SIGNAIGO.